United States Patent [19]

Kato et al.

[11] Patent Number: 4,581,270

[45] Date of Patent: Apr. 8, 1986

[54] FLEXIBLE MAGNETIC DISK

[75] Inventors: Mikihiko Kato; Tsutomu Okita; Shigeo Komine; Yasutoshi Okuzawa; Kazuhiko Morita, all of Kanagawa, Japan

[73] Assignee: Fuji Photo Film Co., Ltd., Kanagawa, Japan

[21] Appl. No.: 632,151

[22] Filed: Jul. 18, 1984

[30] Foreign Application Priority Data

Jul. 18, 1983 [JP] Japan ................. 58-130438

[51] Int. Cl.$^4$ .............................................. G11B 5/72
[52] U.S. Cl. ....................................... 428/65; 360/135;
427/44; 427/54.1; 427/128; 427/131; 428/64;
428/336; 428/137; 428/195; 428/425.9;
428/480; 428/694; 428/695; 428/900
[58] Field of Search ............... 428/695, 694, 425.9,
428/900, 64, 65, 137, 195, 336, 480; 427/44,
54.1, 128, 131; 352/62, 54; 360/134-136

[56] References Cited

U.S. PATENT DOCUMENTS

| | | | |
|---|---|---|---|
| 3,466,156 | 9/1969 | Peters | 427/132 |
| 3,681,225 | 8/1972 | Genma | 427/132 |
| 4,239,828 | 12/1980 | Knope | 428/421 |
| 4,335,183 | 6/1982 | Hosaka | 428/694 |
| 4,368,239 | 1/1983 | Nakajima | 428/522 |
| 4,387,114 | 6/1983 | Conner | 427/54.1 |
| 4,404,247 | 9/1983 | Dominguez-Burguette | 428/900 |
| 4,434,210 | 2/1984 | Nakajima | 427/44 |
| 4,486,500 | 12/1984 | Naruo | 428/695 |

Primary Examiner—Ellis P. Robinson
Attorney, Agent, or Firm—Sughrue, Mion, Zinn Macpeak & Seas

[57] ABSTRACT

A flexible magnetic disc comprising a magnetic sheet having on at least a part thereof a protective layer comprising (a) a straight or branched chain compound having an acrylic or methacrylic acid ester moiety on the end of at least one of the principal chain and the side chain, (b) an aromatic ketone, and (c) a silicone lubricant, said layer being hardenable by photopolymerization.

24 Claims, 6 Drawing Figures

FLEXIBLE MAGNETIC DISK

FIELD OF THE INVENTION

The present invention relates to an improvement in flexible magnetic disks. More particularly, it relates to a flexible magnetic disk which permits fitting to a feeding and reading device with good alignment.

BACKGROUND OF THE INVENTION

A flexible magnetic disk sheet is commonly provided with a jacket having central circular openings aligned with a central circular opening in the sheet. In use, the central circular opening of the sheet is engaged with a positioning member of the feeding and reading device adapted to the sheet, by which magnetic recording on the sheet or magnetic reproduction from the sheet is carried out by revolving the sheet in careful alignment. In such a magnetic disk, since the sheet is enclosed in a jacket with a certain allowance permitting free movement, it shifts position in the jacket, during storage, handling or carrying. When the disk is fitted to the drive device, the circular opening in the center of the sheet may not be in alignment with a positioning member (collet) of the drive device and the sheet may thus be held by the positioning member in an off-center or eccentric position.

FIGS. 1A and 1B show such a flexible magnetic sheet, wherein circular flexible magnetic sheet 2, in which the rim of the central circular opening 2a is exposed, is contained revolvably in rectangular jacket 1 having circular opening 1a in the center.

When this flexible magnetic disk is fitted to the feeding and recording device, sheet 2 is supported by revolving part 3 of the positioning member as shown in FIG. 2, and is held in position by a collet 4 which extends through central circular opening 2a into a circular hollow part 3a of revolving part 3. However, the rim of the central circular opening 2a of the sheet is not always properly aligned with the position of the circular hollow part 3a of the revolving part 3, but frequently deviates. In this case if collet 4 is pressed down on the misaligned sheet, a part of the rim of the circular opening 2a of the sheet 2 is caught between the collet 4 and the hollow part 3a of the revolving part 3 as shown in FIG. 3, and the disk revolves in an eccentric manner. Since proper feeding and reading can only be carried out, if the magnetic disk sheet 2 revolves in a circular fashion, having its center coincident with the revolving axis, it must be kept in such alignment. Further, if the sheet is held by the drive off-center, the flatness of sheet 2 is reduced and a problem of shaking occurs during revolution. In order to correctly align the sheet 2 by pressing down collet 4, as shown in FIG. 4, and to avoid misalignment and crimping of the rim of the circular opening as shown in FIG. 3, the rim of the central circular opening of the sheet must have sufficient hardness, and the coefficient of friction between sheet 1 and collet 4 and revolving part 3 must be small.

For this purpose, U.S. Pat. No. 4,387,114 discloses a mwethod of reducing the coefficient of friction, by providing a protective layer containing a polyolefin material capable of polymerization by ultraviolet rays and an aliphatic acid ester on the rim of the central circular opening which is in contacts with the positioning manner. However, a lubricant having a low molecular weight is used in this method, which has the disadvantage that precision of disc alignment is reduced when the coefficient of friction thereof increases at a comparatively high temperature of 40° C. to 50° C. under a high humidity of 70 to 80%. In addition, the effect of lubrication diminishes when fitting is repeatedly carried out at room temperature, which is believed to be caused by removal of the lubricant from the surface upon repeated use.

SUMMARY OF THE INVENTION

An object of the present invention is to provide a flexible magnetic disk having superior performance which is not affected by changes in temperature and particularly, a disk with improved retension of lubricant under conditions of high temperature and high humidity even if repeatedly used.

Another object of the invention is to provide a flexible magnetic disk sheet having a small coefficient of friction between the disk and the positioning member whereby alignment of the disk and the positioning member of the device are improved.

As a result of their investigations, it has now been found that those and other objects of the present invention may be attained by a flexible magnetic disk wherein on the rim of the central circular opening of the magnetic disk sheet a protective layer containing (a) a photopolymerizable compound having an ester bond of acrylic acid or methacrylic acid on at least one of the end of the molecule and the side chain, (b) an aromatic ketone which functions as a photopolymerization initiator by absorbing ultraviolet rays, and (c) a silicone lubricant is present, which is polymerized by exposure to ultraviolet light in order to harden the protective layer.

DETAILED DESCRIPTION OF THE INVENTION

Figure 1A:
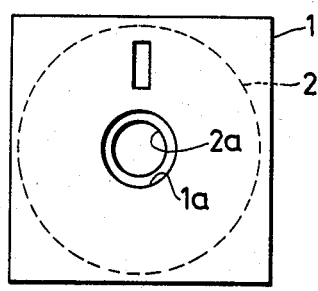
FIG. 1A is a front view of a flexible magnetic disk.
Figure 1B:
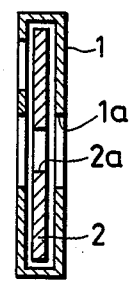
FIG. 1B is a central cross-sectional view of FIG. 1A.
Figure 2:
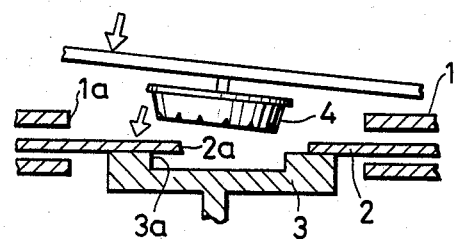
FIGS. 2 and 3 illustrate improper alignment of the flexible magnetic disk with the positioning member of the device.
Figure 3:
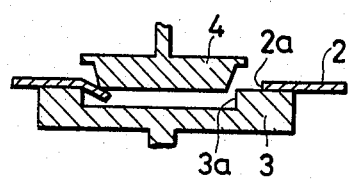
Figure 4:
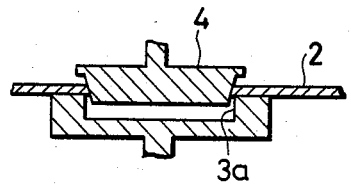
FIG. 4 illustrates correct alignment of the flexible magnetic disc.

In the photopolymerizable coating which is applied to the rim of the circular opening of the magnetic sheet according to the invention, compound (a) is a straight or branched chain compound having an acrylic or methacrylic acid ester moiety on the end of at least one of the principal chain and the side chain as described in A. Vrancken: *Fatipec Congress* (1972). The number of such ester moieties is 1 to 10, preferably 1 to 6, and more preferably 2 to 4, based on 1,000 of the molecular weight. The molecular weight is not restricted, but a range of about 500 to 30,000 as determined by the styrene conversion method by gas phase chromatography is preferred, and a range from oligomer to polymer of about 1,000 to 20,000 is more preferred. Examples of preferred skeletons of the main chain of compound (a) include a poyester skeleton, a polyurethane skeleton, a polyether skeleton, a polycarbonate skeleton and an epoxy resin skeleton, etc. Of these the most preferred is a polyurethane skeleton. Mixed skeletons comprised of these skeletons may be used and two or more of them may be used as a mixture.

Aromatic ketone (b) in the present invention is not restricted and may be any aromatic ketone which is a photo polymerization initiator, but compounds having a comparatively large absorption coefficient to wavelengths of 254, 313 and 365 nm, which form bright line spectra of a mercury lamp conventionally used as a light source for irradiating ultraviolet light are preferred. Examples of (b) include acetophenone, benzophenone, benzoin ethyl ether, benzylmethyl ketal, benzyldimethyl ketal, benzyl ethyl ketal, benzoin isobutyl ketone, hydroxydimethylphenyl ketone, 1-hydroxycyclohexylphenyl ketone, 2,2-diethoxyacetophenone and Michler's ketone, etc. Of these, benzoin ethyl ether, benzyldimethyl ketal and 1-hydroxycyclohexylphenyl ketone are preferred. A mixture of aromatic ketones can be used.

The mixing amount of aromatic ketone used is in a range of about 0.5 to 20 parts by weight, preferably about 2 to 15 parts by weight, and more preferably about 3 to 10 parts by weight, based on 100 parts by weight of compound (a).

As silicone lubricant (c) in the present invention, silicone oils which are mixtures of compounds having various molecular weights and having a comparatively low degree of polymerization can be used, such as dimethylpolysiloxane and methylphenylpolysiloxane, etc. as described in U.S. Pat. No. 4,135,016, but modified silicones which are modified by various substituents can also be used, too. For example, fluorine modified silicones, $C_1$–$C_5$ alkyl modified silicones, $C_6$–$C_{22}$ aliphatic acid modified silicones, alcohol modified silicones, epoxy modified silicones and amino modified silicones, etc. may be used. With such modified silicones, it is possible to improve compatibility with the above described compounds (a) and (b).

The silicone lubricant is preferred to have a viscosity of about 1 to $5 \times 10^6$ cs (25° C.) and about $10^2$ to $10^4$ cs (25° C.).

The amount of the silicone lubricant used is in a range of about 0.5 to 20 parts by weight, preferably 2 to 15 parts by weight and, more preferably about 3 to 10 parts by weight, based on 100 parts by weight of compound (a).

In preparing a coating solution by blending the above described compounds (a), (b) and (c), various organic solvents can be used if desired, without limitation. If compound (a) is liquid at room temperature, no solvent is required. Examples of useful organic solvents include ketones such as acetone, methyl ethyl ketone, methyl isobutyl ketone or cyclohexanone, etc.; alcohols such as methanol, ethanol, propanol or butanol, etc.; esters such as methyl acetate, ethyl acetate, butyl acetate, ethyl lactate, or glycol monoethyl ether acetate, etc.; glycol ethers such as ether, glycol dimethyl ether, glycol monoethyl ether or dioxane, etc.; tars (aromatic hydrocarbons) such as benzene, toluene or xylene, etc.; and other generally known organic solvents such as methylene chloride, ethylene chloride, carbon tetrachloride, chloroform, ethylene chlorohydrin and dichlorobenzene, etc. Of these, methyl ethyl ketone, butyl acetate and toluene are preferred.

The coating solution prepared by blending the above described compounds (a)–(c) is applied to the rim of the central circular opening of the flexible magnetic disk sheet. The resultant coating can be cured by exposing a web moving at a speed of 10 to 50 m/min. to ultraviolet light having an intensity of 80 w/cm from a high pressure mercury lamp at a distance of 15 cm. The thickness of the coating after irradiation polymerization is in a range of about 1 to 50μ, preferably about 5 to 30μ, and more preferably about 10 to 20μ. If the thickness of the coating is beyond the above-described range, there is a possibility that track deviation during operation will result. Further, if it is less than the above-described range, the result obtained is insufficient.

The width of the protecting layer may be varied appropriately depending on the size of the disk sheet. For instance, in the case of a 5.25 inch diameter disk sheet, the width of the protecting layer generally is from 2 to 5 mm, preferably is from 2.5 to 3.5 mm, and more preferably is from 2.75 to 3.25 mm. Also preferably, a slight clearance is provided between the edge of the protecting layer and the edge of the central circular opening; this clearance is generally from 15 to 500μ, preferably 30 to 350μ, and more preferably 50 to 200μ.

The present invention is explained in greater detail by reference to the following examples, but the present invention should not be construed as being limited thereto.

Figure 5:
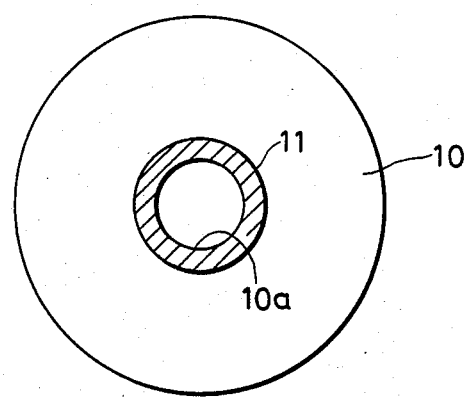
FIG. 5 illustrates the magnetic sheet component of a flexible magnetic disc according to the present invention.

In the following Examples, a flexible magnetic disc as illustrated in FIG. 5 was prepared by applying a protective layer 11 according to the present invention to both sides of the flexible magnetic sheet 10 along the rim of the central circular opening 10a. The protective layer thus applied has a width of 3 mm, and has the following composition:

EXAMPLE 1

| | Parts by Weight |
| --- | --- |
| Polyurethane Acrylate M-1100 produced by Toagosei Chem. Ind. Co. (Mw: about 1,000) | 100 |
| Myristic Acid Modified Silicone TA 930 produced by Shinetsu Chem. Ind. Co. ($\eta$: 1.0 to 1.2 cs (25° C.)) | 3 |
| Benzyl Dimethyl Ketal | 9 |

EXAMPLE 2

| | Parts by Weight |
| --- | --- |
| Polyurethane Acrylate M-1100 produced by Toagosei Chem. Ind. Co. (Mw: about 1,000) | 100 |
| Fluorine Myristic Acid Modified Silicone TA 4230 produced by Shinetsu Chem. Ind. Co. ($\eta$: 1.0 to 1.2 cs (25° C.)) | 9 |
| Benzyl Dimethyl Ketal | 3 |

EXAMPLE 3

| | Parts by Weight |
| --- | --- |
| Polyurethane Acrylate M-1100 produced by Toagosei Chem. Ind. Co. (Mw: about 1,000) | 100 |
| Myristic Acid Modified Silicone TA 930 produced by Shinetsu Chem. Ind. Co. ($\eta$: 1.0 to 1.2 cs (25° C.)) | 5 |
| Benzoin ethyl ether | 9 |

EXAMPLE 4

| | Parts by Weight |
| --- | --- |
| Polyester Acrylate M-8030 produced by Toagosei Chem. Ind. Co. | 100 |
| Fluorine Myrsitic Acid Modified Silicone TA 4230 produced by Shinetsu Chem. Ind. Co. ($\eta$: 1.0 to 1.2 cs (25° C.)) | 5 |

EXAMPLE 4-continued

| | Parts by Weight |
|---|---|
| Benzoin Ethyl Ether | 5 |

COMPARATIVE EXAMPLE 1

| | Parts by Weight |
|---|---|
| Polyurethane Acrylate M-1100 produced by Toagosei Chem. Ind. Co. (Mw: about 1,000) | 100 |
| Butyl Stearate | 5 |
| Benzyl Dimethyl Ketal | 5 |

COMPARATIVE EXAMPLE 2

No protective layer

Coating solutions having the above-described compositions were prepared, and applied to the rim of the central circular opening of conventional flexible magnetic disk sheet in an amount of 15 g/m², namely to a thickness of 13μ. The thus-applied coating layer (passed at a line speed of 30 m/min) was exposed to ultraviolet light using a high-pressure mercury lamp of 80 W/cm. at a distance of 15 cm from the center of the lamp, whereby the layer was radiation cured to form a hardened polymeric layer.

Measurement of coefficient of friction between the sheets thus prepared and the upper positioning member (4), and a test of fitting the sheet to disk drives were carried out both at 25° C., 80% RH and at 40° C., 80% RH. Results are shown in the following table.

The measurement of coefficient of friction was carried out using a tensile tester manufactured by Fuji Photo Film Co., Ltd. and a strain guage Model WT-1K manufactured by NMB Co., Ltd. by rubbing the positioning member (4) (collet) on the magnetic sheet at a running rate of 0.8 mm/sec. using a weight of 70 g as a load. Coefficient of friction between the sheet and the positioning member (3) (revolving part) was measured by the same manner as described above.

Drives used for the test of fitting the sheet to the disk drives were YD-280 and YD-380 produced by Y-E Data Co., JA751 and JA561 produced by Matsushita Communication Ind. Co. and M-2894 and M-4853 produced by Mitsubishi Electric Corp.

In each test fitting was repeated 10 times. In the table, the case that an inferior result was not obtained i.e., biting along the rim of the central circular openings was not observed by the whole drives is shown as O and the case that an inferior result is obtained by one or more drives is shown as X.

TABLE

| | Measurement Condition | | | | | |
|---|---|---|---|---|---|---|
| | 25° C., 80% RH | | | 40° C., 80% RH | | |
| | Coefficient of Friction (μ) | | | Coefficient of Friction (μ) | | |
| | To Collet | To Revolving Part | Test of fitting to Disk Drive | To Collet | To Revolving Part | Test of Fitting to Disk Drive |
| Example 1 | 0.35 | 0.25 | O | 0.34 | 0.28 | O |
| Example 2 | 0.30 | 0.22 | O | 0.32 | 0.26 | O |
| Example 3 | 0.32 | 0.24 | O | 0.32 | 0.28 | O |
| Example 4 | 0.29 | 0.20 | O | 0.29 | 0.25 | O |
| Comparative Example 1 | 0.36 | 0.25 | O | 0.47 | 0.37 | X |
| Comparative Example 2 | 0.55 | 0.43 | X | 0.65 | 0.53 | X |

In Comparative Example 1, a lubricant conventionally used for preparing recording media was used in place of the silicone lubricant of the present invention. However, the coefficient of friction using a conventional lubricant is high and the result of the fitting test is inferior as compared with using silicone lubricants. In Comparative Example 2, using no protective layer, the results are further inferior. It is understood from these examples that the protective layer according to the present invention keeps the coefficient of friction at a low value even at high temperature and high humidity, and an improvement is shown in the test of fitting.

While the invention has been described in detail and with reference to specific embodiment thereof, it will be apparent to one skilled in the art that various changes and modifications can be made therein without departing from the spirit and scope thereof.

What is claimed is:

1. A flexible magnetic disc comprising a magnetic sheet having on at least a part thereof a protective layer comprising (a) a straight or branched chain compound having an acrylic or methacrylic acid ester moiety on the end of at least one of the principal chain and the side chain, (b) an aromatic ketone, wherein said aromatic ketone (b) is present in a range of about 0.5 to 20 parts by weight per 100 parts by weight of compound (a), and (c) a silicone lubricant, wherein said silicone lubricant (c) is present in a range of from about 0.5 to 20 parts by weight per 100 parts by weight of compound (a), said layer being hardenable by photopolymerization, wherein said protective layer is formed only on a surface portion surrounding the edge of a central circular hole of the flexible magnetic disc.

2. The flexible magnetic disc as claimed in claim 1, wherein said magnetic sheet has a central circular opening, and said protective layer is provided on the rim of said circular opening on at least one side of said sheet.

3. The flexible magnetic disc as claimed in claim 2, wherein compound (a) has a molecular weight in the range of about 500 to about 30,000, as determined by the styrene conversion method.

4. The flexible magnetic disc as claimed in claim 3, wherein compound (a) has a molecular weight in the range of from about 1,000 to 20,000.

5. The flexible magnetic disc as claimed in claims 2 or 3, wherein compound (a) has from 1 to 10 ester moieties per 1,000 of the molecular weight.

6. The flexible magnetic disc as claimed in claims 2 or 3, wherein compound (a) has from 1 to 6 ester moieties per 1,000 of the molecular weight.

7. The flexible magnetic disc as claimed in claims 2 or 3, wherein compound (a) has from 2 to 4 ester moieties per 1,000 of the molecular weight.

8. The flexible magnetic disc as claimed in claim 2, wherein said aromatic ketone (b) is a photopolymerization initiator.

9. The flexible magnetic disc as claimed in claim 8, wherein aromatic ketone (b) is present in a range of from about 2 to 15 parts by weight per 100 parts by weight of compound (a).

10. The flexible magnetic disc as claimed in claim 9, wherein said aromatic ketone (b) is present in a range of from about 3 to 10 parts by weight per 100 parts by weight of compound (a).

11. The flexible magnetic disc as claimed in claim 2, wherein said silicone lubricant (c) has a viscosity of from about 1 to $5 \times 10^6$ cs at 25° C.

12. The flexible magnetic disc as claimed in claim 2, wherein said silicone lubricant (c) has a viscosity of from about $10^2$ cs to $10^4$ cs at 25° C.

13. The flexible magnetic disc as claimed in claim 11, wherein said silicone lubricant (c) is present in a range of from about 2 to 15 parts by weight per 100 parts by weight of compound (a).

14. The flexible magnetic disc as claimed in claim 11, wherein said silicone lubricant (c) is present in a range of from about 3 to 10 parts by weight per 100 parts by weight of compound (a).

15. The flexible magnetic disc as claimed in claim 2, wherein said protective layer has a thickness of from about 1 to 50 microns.

16. The flexible magnetic disc as claimed in claim 2, wherein said protective layer has a thickness of from about 5 to 30 microns.

17. The flexible magnetic disc as claimed in claim 2, wherein said protective layer has a thickness of from about 10 to 20 microns.

18. The flexible magnetic disc as claimed in claim 1, wherein compound (a) has a molecular weight in the range of about 500 to 30,000, as determined by the styrene conversion method and has from 1 to 6 ester moieties per 1,000 of the molecular weight, wherein said aromatic ketone (b) is a photopolymerization initiator, wherein said silicone lubricant (c) has a viscosity of from about 1 to $5 \times 10^6$ cs at 25° C. and wherein said protective layer has a thickness of from about 1 to 50 microns.

19. The flexible magnetic disc as claimed in claim 18, wherein said photopolymerization is by ultra-violet light, whereby said aromatic ketone photopolymerization initiator is activated.

20. The flexible magnetic disc as claimed in claim 18, wherein said compound (a) has a skeleton selected from the group consisting of a polyester skeleton, a polyurethane skeleton, a polyether skeleton, a polycarbonate skeleton and an epoxy resin skeleton.

21. The flexible magnetic disc as claimed in claim 20, wherein said skeleton is a polyurethane skeleton.

22. The flexible magnetic disc as claimed in claim 21, wherein said aromatic ketone is selected from the group consisting of acetophenone, benzophenone, benzoin ethyl ether, benzylmethyl ketal, benzyldimethyl ketal, benzyl ethyl ketal, benzoin isobutyl ketone, hydroxydimethylphenyl ketone, 1-hydroxycyclohexylphenyl ketone, 2,2-diethyoxyacetophenone and Michler's ketone.

23. The flexible magnetic disc as claimed in claim 22, wherein said silicone lubricant (c) as selected from the group consisting of dimethylpolysiloxane, methylphenylpolysiloxane, fluorine modified silicones, $C_1$-$C_5$ alkyl modified silicones, $C_6 \propto C_{22}$ aliphatic acid modified silicones, alcohol modified silicones, epoxy modified silicones and amino modified silicones.

24. The flexible magnetic disc as claimed in claim 23, wherein compound (a) has a molecular weight in the range from about 1,000 to 20,000, as determined by the styrene conversion method and has from 1 to 6 ester moieties per 1,000 of the molecular weight, wherein said aromatic ketone (b) is a photopolymerization initiator, wherein the aromatic ketone is present in a range of from about 2 to 15 parts by weight per 100 parts by weight of compound (a), wherein said slicon lubricant has a viscosity of from about $10^2$ cs to $10^4$ cs at 25° C. and wherein said protective layer has a thickness of from about 5 to 30 microns, said protective layer being hardened by ultra-violet light photopolymerization.

* * * * *